(12) United States Patent
Gopan et al.

(10) Patent No.: US 11,535,453 B2
(45) Date of Patent: Dec. 27, 2022

(54) AUTOMATIC ELECTROMECHANICAL BRAKING ROLLER SYSTEMS AND METHODS

(71) Applicant: GOODRICH CORPORATION, Charlotte, NC (US)

(72) Inventors: Vishnu Gopan, Triavndrum (IN); Narain Jayaprakash, Bangalore (IN)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 17/132,196

(22) Filed: Dec. 23, 2020

(65) Prior Publication Data
US 2021/0261342 A1 Aug. 26, 2021

(30) Foreign Application Priority Data
Feb. 20, 2020 (IN) .............................. 202041007353

(51) Int. Cl.
*B65G 13/06* (2006.01)
*B64D 9/00* (2006.01)
*B65G 13/075* (2006.01)
*H02K 1/278* (2022.01)

(52) U.S. Cl.
CPC ............. *B65G 13/065* (2013.01); *B64D 9/00* (2013.01); *B64D 2009/006* (2013.01); *B65G 13/075* (2013.01); *B65G 2203/042* (2013.01); *H02K 1/278* (2013.01)

(58) Field of Classification Search
CPC ................ B65G 13/065; B65G 13/075; B65G 2203/042; B64D 9/00; B64D 2009/006; H02K 1/278
See application file for complete search history.

(56) References Cited

U.S. PATENT DOCUMENTS

| 4,235,316 A | 11/1980 | Blomberg |
| 6,244,427 B1 | 6/2001 | Syverson |
| 6,420,846 B1 * | 7/2002 | Wolfe .................... B64D 9/00 198/780 |
| 6,612,422 B2 | 9/2003 | Roberts et al. |
| 6,820,736 B2 | 11/2004 | Itoh et al. |
| 7,014,038 B2 | 3/2006 | Leingang et al. |

(Continued)

FOREIGN PATENT DOCUMENTS

| GB | 2442150 A * | 3/2008 | ............... B64D 9/00 |
| JP | 4607103 B2 * | 1/2011 | ............... B60P 1/52 |
| WO | WO-2010138984 A1 * | 12/2010 | ............. B65G 23/10 |

*Primary Examiner* — Gene O Crawford
*Assistant Examiner* — Lester Rushin, III
(74) *Attorney, Agent, or Firm* — Snell & Wilmer L.L.P.

(57) ABSTRACT

An automatic electromechanical braking roller system includes a power drive unit (PDU) comprising a sensor configured to detect a speed of a unit load device (ULD), a controller configured to receive a speed signal corresponding to a speed of the ULD from the sensor, and an electromechanical braking roller (EBR) spaced apart from the PDU and configured to receive a braking signal from the controller in response to the speed of the ULD being greater than a threshold value. In response to the speed of the ULD being less than the threshold value, the EBR is configured to rotate freely about an axis in a first state. In response to the speed of the ULD being greater than the threshold value, the EBR is configured to reduce the speed of the ULD in a second state.

18 Claims, 7 Drawing Sheets

(56) References Cited

U.S. PATENT DOCUMENTS

| | | | | |
|---|---|---|---|---|
| 7,021,456 B2* | 4/2006 | Haan | ................... | B65G 13/075 |
| | | | | 198/781.01 |
| 7,199,543 B1* | 4/2007 | Hettwer | ................. | B64D 9/00 |
| | | | | 198/781.01 |
| 9,650,139 B2* | 5/2017 | Huber | .................... | B64D 9/00 |
| 9,889,990 B2 | 2/2018 | Dimitrov et al. | | |
| 10,995,808 B1* | 5/2021 | Larson | ............... | B65G 13/075 |

* cited by examiner

AUTOMATIC ELECTROMECHANICAL BRAKING ROLLER SYSTEMS AND METHODS

CROSS-REFERENCE TO RELATED APPLICATIONS

This application is a non-provisional of, and claims priority to, and the benefit of India Provisional Application No., 202041007353 with DAS code DB51, entitled "AUTOMATIC ELECTROMECHANICAL BRAKING ROLLER SYSTEMS AND METHODS," filed on Feb. 20, 2020, which is hereby incorporated by reference in its entirety

FIELD

The disclosure generally relates to aircraft cargo systems, and more particularly to the design of a motor power drive unit and braking roller for an aircraft cargo system.

BACKGROUND

Aircraft used for the transport of cargo typically have cargo doors at a side of the aircraft. A loader may load a unit load device (ULD) into the aircraft through one of the cargo doors. In an area in the vicinity of the door inside the aircraft, motorized devices in the floor of the cargo hold are able to pull the ULD into the aircraft and then direct it to the final storage and transportation location, where it may be locked in place. The ULD may be moved forward or aft by motorized rollers, or power drive units (PDUs), in the floor. Braking rollers are used to slow down the ULD during loading and unloading, irrespective of the speed of the ULD.

SUMMARY

An automatic electromechanical braking roller system is disclosed, comprising a power drive unit (PDU) comprising a sensor configured to detect a speed of a unit load device (ULD), a controller configured to receive a speed signal corresponding to a speed of the ULD from the sensor, and an electromechanical braking roller (EBR) spaced apart from the PDU and configured to receive a braking signal from the controller in response to the speed of the ULD being greater than a threshold value. In response to the speed of the ULD being less than the threshold value, the EBR is configured to rotate freely about an axis in a first state. In response to the speed of the ULD being greater than the threshold value, the EBR is configured to reduce the speed of the ULD in a second state.

In various embodiments, in response to receiving the braking signal from the controller, the EBR is energized.

In various embodiments, the PDU comprises a disk configured to spin freely with respect to the PDU.

In various embodiments, the disk comprises a magnet.

In various embodiments, the sensor comprises a Hall-effect sensor.

In various embodiments, the sensor detects the ULD speed via the disk.

In various embodiments, the PDU further comprises a motorized roller.

In various embodiments, a diameter of the disk is greater than a diameter of the motorized roller.

In various embodiments, the disk comprises a polymer material.

A power drive unit (PDU) is disclosed, comprising a motorized roller configured to rotate about an axis, a disk configured to rotate freely, a sensor in operable communication with the disk, wherein the disk is configured to contact a unit load device (ULD) in response to the ULD translating across the PDU, the disk is configured to rotate in response to the contact, and the sensor is configured to detect a speed of the ULD via the disk.

In various embodiments, the disk comprises a magnet, and the sensor is configured to detect the rotational velocity of the disk via the magnet.

In various embodiments, the sensor comprises a Hall-effect sensor.

In various embodiments, a diameter of the disk is greater than a diameter of the motorized roller.

In various embodiments, the disk comprises a polymer material.

In various embodiments, the disk and the motorized roller are disposed coaxially.

An electromechanical braking roller (EBR) is disclosed, comprising an inner shaft, an electromagnetic actuator disposed around the inner shaft, a brake stack disposed around the inner shaft, a first bearing disposed around the inner shaft, a second bearing disposed around the inner shaft, the first bearing and the second bearing are disposed at opposite ends of the inner shaft, and a cylindrical roller member disposed around the inner shaft.

In various embodiments, the brake stack comprises a first brake disk, a second brake disk, and a skew roller disposed the first brake disk and the second brake disk.

In various embodiments, the EBR further comprises an end thrust needle cage bearing disposed between the electromagnetic actuator and the brake stack, wherein the end thrust needle cage bearing is configured to transfer forces between the electromagnetic actuator and the brake stack.

In various embodiments, the cylindrical roller member is configured to freely rotate with respect to the inner shaft in a first state.

In various embodiments, the first brake disk is coupled to the cylindrical roller member, whereby a braking force is transferred between the brake stack and the cylindrical roller member in response to the electromechanical actuator applying a braking force to the brake stack in a second state.

The foregoing features, elements, steps, or methods may be combined in various combinations without exclusivity, unless expressly indicated herein otherwise. These features, elements, steps, or methods as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "electronic communication" means communication of electronic signals with physical coupling (e.g., "electrical communication" or "electrically coupled").

Power drive units (PDUs), as described herein, may be robust, compact, and reliable for cargo handling in aircraft cargo hold floors. PDUs of the present disclosure may provide weight savings and reduced parts count.

Figure 1:
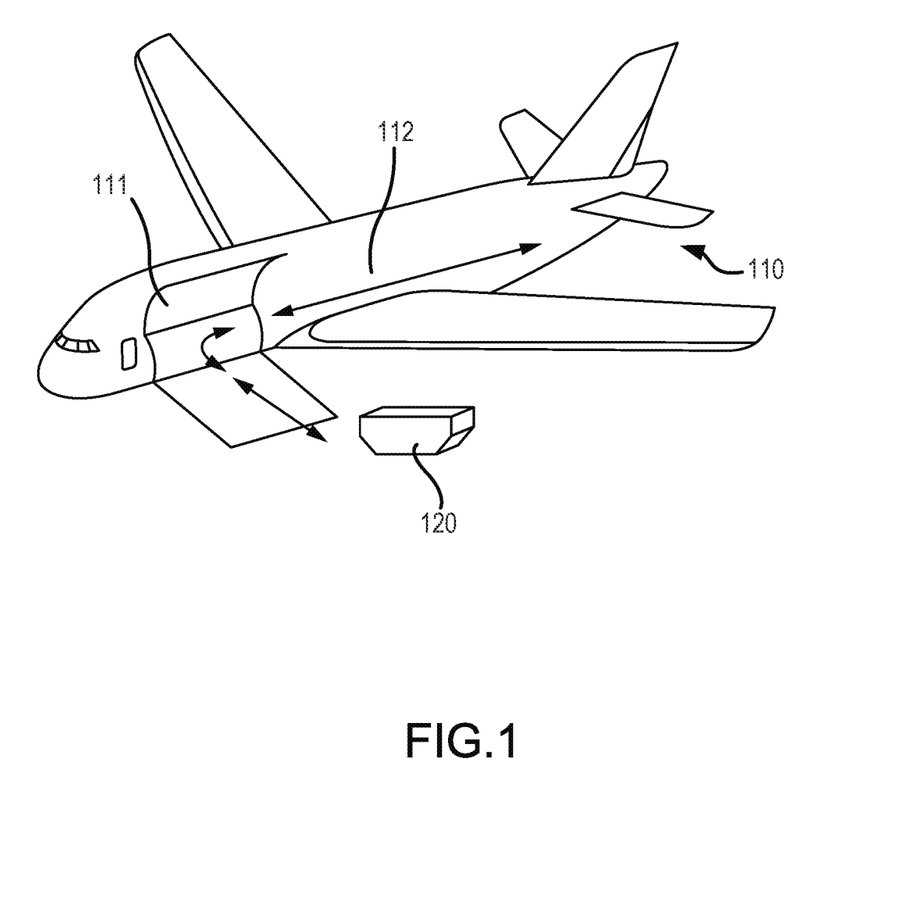
FIG. 1 illustrates a schematic view of an aircraft being loaded with cargo, in accordance with various embodiments.

With reference to FIG. 1, a schematic view of an aircraft 110 having a cargo hold 112 is illustrated, in accordance with various embodiments. The aircraft 110 may comprise a cargo load door 111 at one side of the fuselage structure of the aircraft 110. Through the cargo load door 111, cargo may be loaded into the cargo hold 112 of the aircraft 110 or unloaded from the cargo hold 112 of the aircraft 110.

Items to be shipped by air are typically loaded first onto specially configured pallets or into specially configured containers. In aviation, those various pallets and/or containers commonly are referred to as Unit Load Devices (ULDs). ULDs are available in various sizes and capacities, and are typically standardized in dimension and shape. A ULD—in the example of FIG. 1 a ULD 120—usually is loaded with cargo at a location other than the immediate vicinity of the aircraft 110. Once loaded with cargo items, the ULD is transferred to the aircraft, and is loaded onto the aircraft 110 through the cargo load door 111 using a conveyor ramp, scissor lift, or the like. Once inside the aircraft 110, the ULD is moved within the cargo hold to its final stowage position. Multiple ULDs may be brought on-board the aircraft, with each ULD being placed in its respective stowage and transportation position in the cargo hold 112. After the aircraft 110 has reached its destination, the ULDs are unloaded from the aircraft 110 similarly, but in reverse sequence to the loading procedure.

To facilitate movement of a ULD within the cargo hold 112, the floor of the cargo hold 112 may include actively driven motorized roller components that engage with the bottom of the ULD. Particularly, in the vicinity of the cargo load door 111, roller components may both move the ULD through the cargo load door 111 perpendicular to the longitudinal axis 290 (with momentary reference to FIG. 2) of the aircraft 110 and within the cargo hold 112 of the aircraft 110 parallel to the main axis of the aircraft 110.

Figure 2:
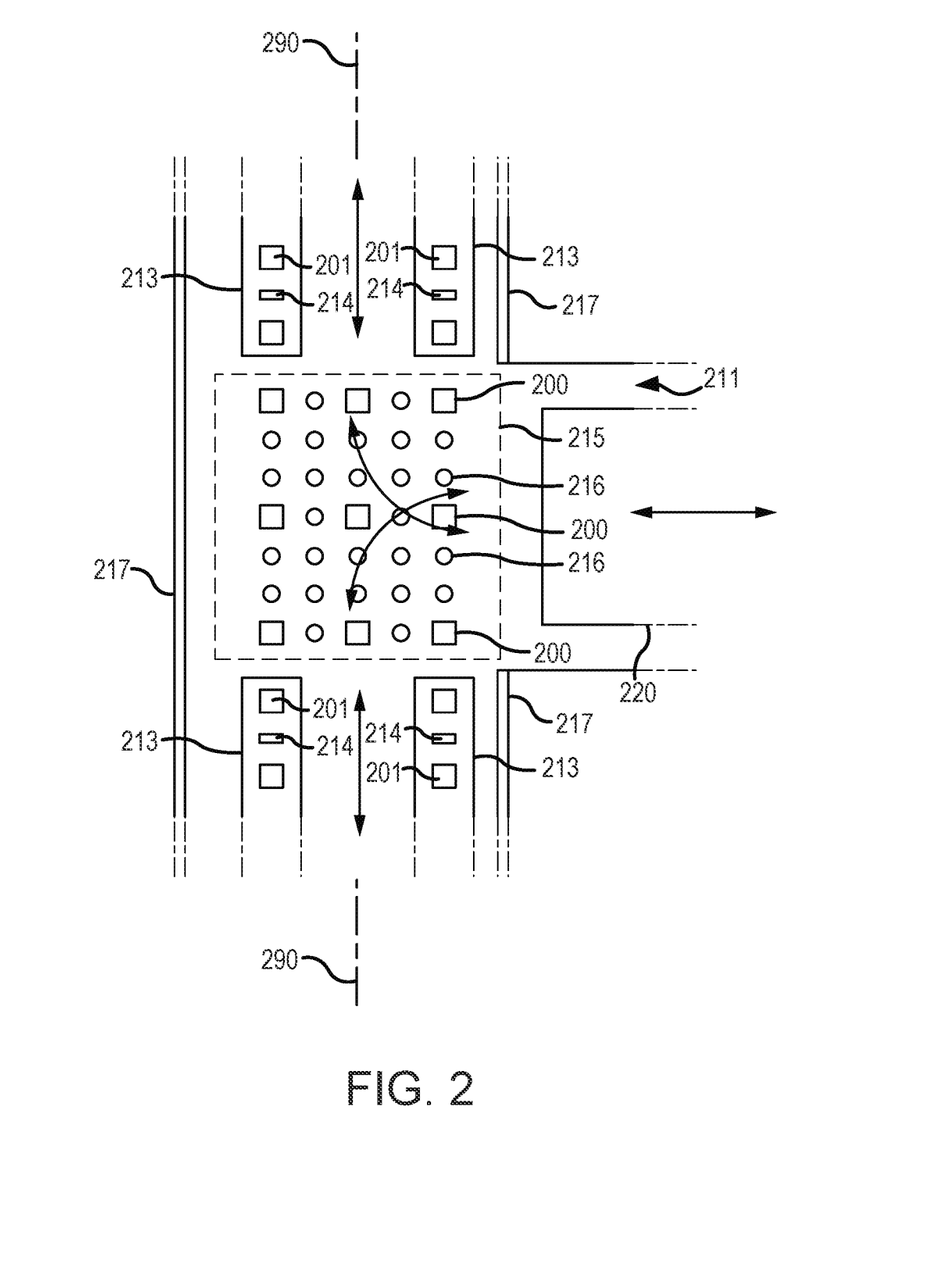
FIG. 2 illustrates a schematic view of a cargo hold floor for an aircraft having multiple PDUs, in accordance with various embodiments.

With reference to FIG. 2, a schematic illustration of a part of a cargo hold of an aircraft, for example the cargo hold 112 of the aircraft 110 in FIG. 1, is illustrated, in accordance with various embodiments. The aircraft is delimited by an aircraft hull 217 which opens on one side to a cargo load door 211. A ULD 220 is indicated as being loaded into the cargo hold.

A cargo hold floor 215 is located in a cargo loading area in the vicinity of a cargo load door 211 of the aircraft. The cargo hold floor 215 may comprise a plurality of PDUs 200 which are generally arranged in a matrix arrangement, wherein motorized rollers of the PDUs 200 protrude from the surface of the cargo hold floor 215 in order to engage with the bottom of the ULD 220 as it is guided onto the cargo hold floor 215.

A plurality of roller elements 216 may be arranged between the plurality of PDUs 200 in a matrix arrangement as well. The roller elements 216 may be passive elements, for example roller ball units that serve as stabilizing and guiding means for the ULD 220 as it is conveyed on the cargo hold floor 215 by the PDUs 200.

The number of PDUs 200 and roller elements 216 is only exemplarily depicted in FIG. 2 and a different number and placement of the PDUs 200 and roller elements 216 may be chosen as well, depending on the respective application of the cargo hold floor 215 in the aircraft. Moreover, the positioning of the PDUs 200 and roller elements 216 may deviate from the standard rectangular matrix arrangement as well and may be adapted to the outer shape of the cargo hold floor 215, which may take other geometries as well.

The cargo hold floor 215 may be located between conveyor belts 213 having PDUs 201 and braking rollers 214 in order to convey ULDs 220 within the cargo hold parallel to the longitudinal axis 290 of the aircraft, once the ULD has been transferred from the cargo hold floor 215 to the conveyor belts 213. In various embodiments, conveyor belts 213 comprise rails have PDUs 201 and braking rollers 214 whereupon ULDs are moved along to their final stowage position inside the cargo hold 112 (with momentary reference to FIG. 1). In various embodiments, conveyer belts 213 comprise further roller elements (active or passive) to assist movement of the ULDs.

In various embodiments, the PDUs (i.e., PDU 200) are arranged and configured to pull the ULD 220 through the cargo load door 211 with the PDUs propelling the ULD in a perpendicular direction to the longitudinal axis 290 of the aircraft. In various embodiments, the PDUs (i.e., PDU 200) are arranged and configured to move the ULD 220 onto the conveyor belts 213 for further transfer by the PDUs 201 into the cargo hold 112 (See FIG. 1) and the final stowage position in the aircraft. In various embodiments, the PDUs (i.e., PDU 201) and braking rollers 214 are configured to drive the ULD 220 along the conveyer belts 213 in a direction parallel with the longitudinal axis 290 of the aircraft until the ULD 220 has reached its final stowage position in the aircraft cargo hold 112.

Figure 3:
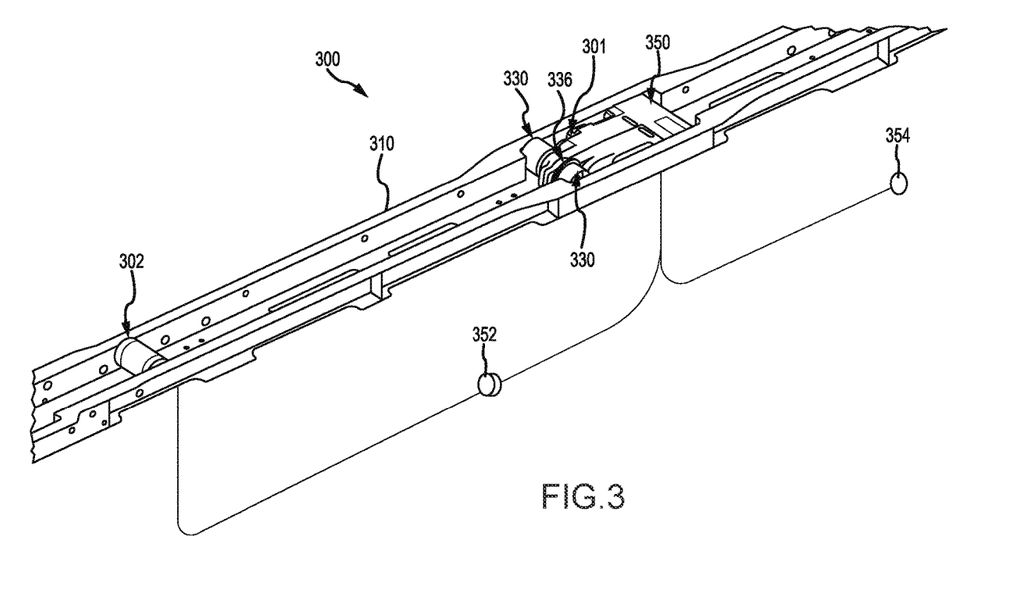
FIG. 3 illustrates a perspective, isolated view of an automatic electromechanical braking roller system comprising a EBR in electronic communication with a PDU, in accordance with various embodiments.

With reference to FIG. 3, an isolated view of a system 300 (also referred to herein as an automatic electromechanical braking roller system) is illustrated, in accordance with various embodiments. System 300 comprises a PDU 301 in electronic communication with an electromechanical braking roller (EBR) 302. PDU 301 may comprise a sensor, as disclosed herein, configured to detect a speed of a ULD translating thereon. System 300 may further comprise a processing unit 350 (also referred to herein as a controller) configured to receive a speed signal corresponding to a speed of the ULD from the sensor and send a braking signal to EBR 302 in response to the speed of the ULD being greater than a threshold value. EBR 302 may be spaced apart from PDU 301. EBR 302 may be configured to receive the braking signal—e.g., an electrical current signal as described herein—from the processing unit 350. In response to the speed of the ULD being less than the threshold value, the EBR 302 may be configured to rotate freely about an axis in a first state, as described herein. In response to the speed of the ULD being greater than the threshold value, the EBR 302 may be configured to reduce the speed of the ULD in a second state, as described herein. Stated differently, in operation, PDU 301 detects the speed of a ULD (e.g., see ULD 220 of FIG. 2) as the ULD rolls over the PDU 301 and, in response to the speed of the ULD being greater than a predetermined threshold value, sends a braking signal to EBR 302 that actuates the EBR 302 to inhibit rotation (i.e., apply braking) of the EBR 302 and slow down the ULD. In response to the ULD moving at a speed which is less than the threshold value, the EBR 302 is configured to freely rotate. In this manner, the EBR 302 selectively applies braking to a ULD based upon the detected speed of the ULD by the PDU 301.

In various embodiments, PDU 301 is electronically coupled to EBR 302 via a wired connection 352. In various embodiments, PDU 301 and/or EBR 302 are powered by a power supply 354.

The system 300 may for example be employed in cargo hold floors of aircraft, such as the aircraft 110 of FIG. 1. In various embodiments, PDU 301 and EBR 302 are mounted along a track system 310. Track system 310 may be a frame structure mounted in the floor of a cargo hold for an aircraft. In this regard, system 300 may be implemented in cargo hold floor 215 and/or conveyor belts 213 of FIG. 2. It is contemplated herein, that system 300 may be implemented in any desired manner in a cargo hold of an aircraft or other vehicles. Furthermore, system 300 may be implemented in non-vehicle conveyor systems without departing from the scope of the present disclosure.

Figure 4A:
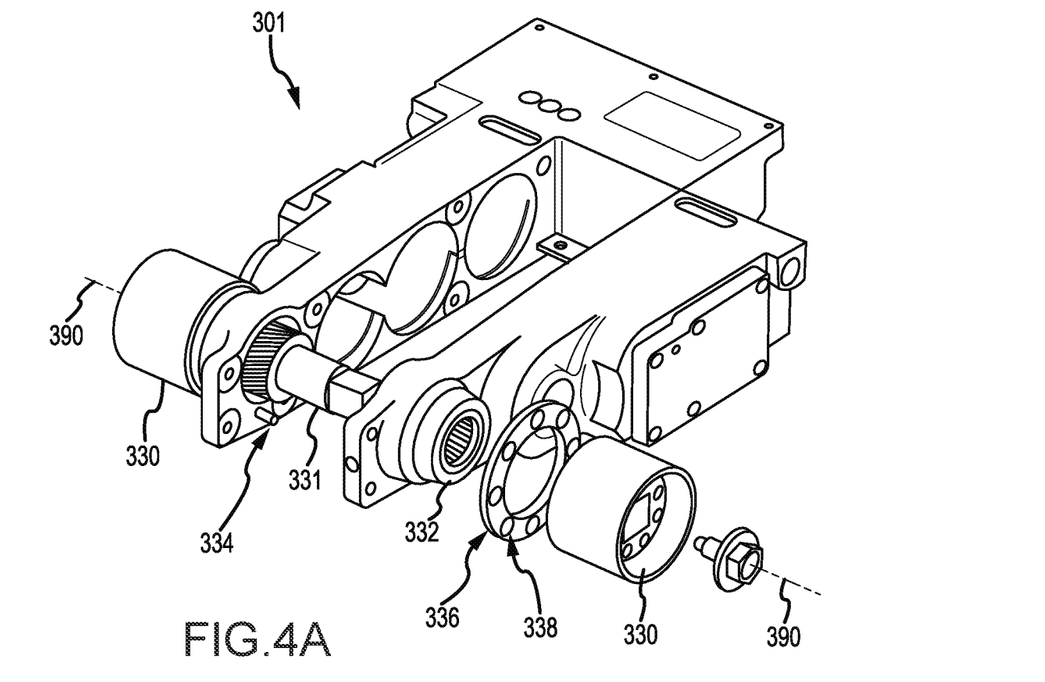
FIG. 4A illustrates a partially exploded view of a PDU, in accordance with various embodiments.

With reference to FIG. 4A, a partially exploded view of PDU 301 is illustrated, in accordance with various embodiments. PDU 301 may comprise one or more motorized rollers 330. In this regard, motorized rollers 330 may be coupled to a motor-driven shaft 331 whereby the motorized rollers 330 are rotated for propelling a ULD in a desired direction. PDU 301 may comprise a disk 336 configured to freely rotate. Disk 336 may be configured to rotate independent from motorized rollers 330.

In various embodiments, disk 336 is mounted to a cylindrical member 332 of the PDU 301. In this installed position, motor-driven shaft 331 may at least partially extend through cylindrical member 332. In this regard, disk 336 may be coaxial with motorized rollers 330. Stated differently, disk 336 and motorized rollers 330 may rotate about a common axis 390.

In various embodiments, PDU 301 further comprises a sensor 334 in operable communication with the disk 336. Sensor 334 may be configured to detect a rotational velocity of disk 336. Disk 336 may comprise one or more magnets 338. In various embodiments, sensor 334 is a Hall-effect sensor configured to detect the rotational velocity of disk 336 via magnets 338. In this regard, sensor 334 may detect a magnetic field emitted by magnets 338. Magnets 338 may be coupled to disk 336. Magnets 338 may be at least partially embedded in disk 336. Disk 336 may be configured to contact a ULD moving across PDU 301, wherein the ULD causes disk 336 to rotate at a rotational velocity corresponding to a speed of the ULD. In this regard, sensor 334 may determine a speed of the ULD based upon the rotational velocity of disk 336.

In various embodiments, the diameter of disk 336 may be greater than the diameter of motorized roller(s) 330. In this manner, the disk 336 may protrude above motorized roller(s) 330 to ensure contact with the ULD as it rolls across the PDU 301. In various embodiments, disk 336 is made from a soft, rubbery material to allow the disk 336 to deform under the weight of the ULD such that the ULD also contacts the motorized roller(s) 330 which are disposed below a periphery of disk 336 due to their decreased diameter when they are concentric with disk 336. For example, disk 336 may be formed from a polymer material, such as polyurethane (PU), in accordance with various embodiments.

Figure 4B:
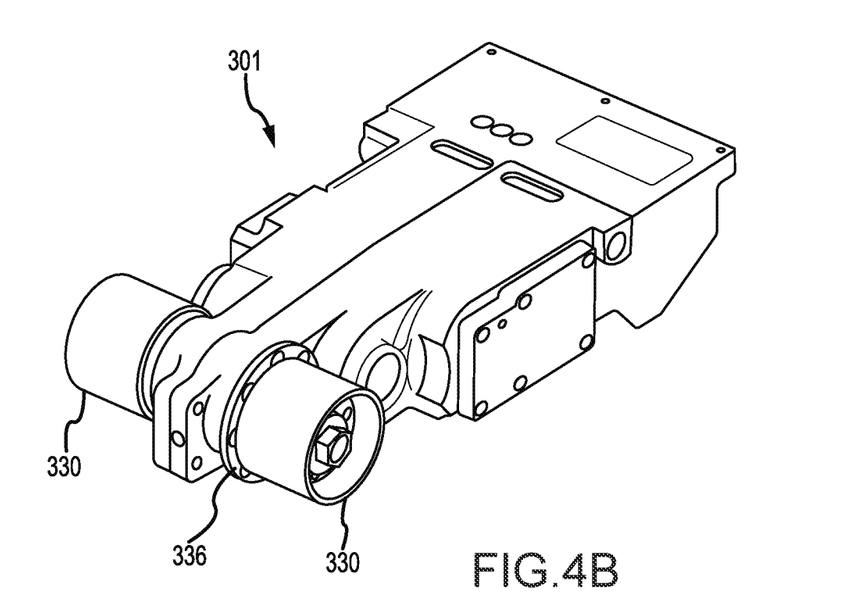
FIG. 4B illustrates a perspective view of the PDU of FIG. 4A, in accordance with various embodiments.

With reference to FIG. 4B, a perspective view of PDU 301 is illustrated. In the installed position, the disk 336 may be spaced apart from motorized roller(s) 330. Disk 336 may freely spin independent of motorized roller(s) 330.

Figure 5A:
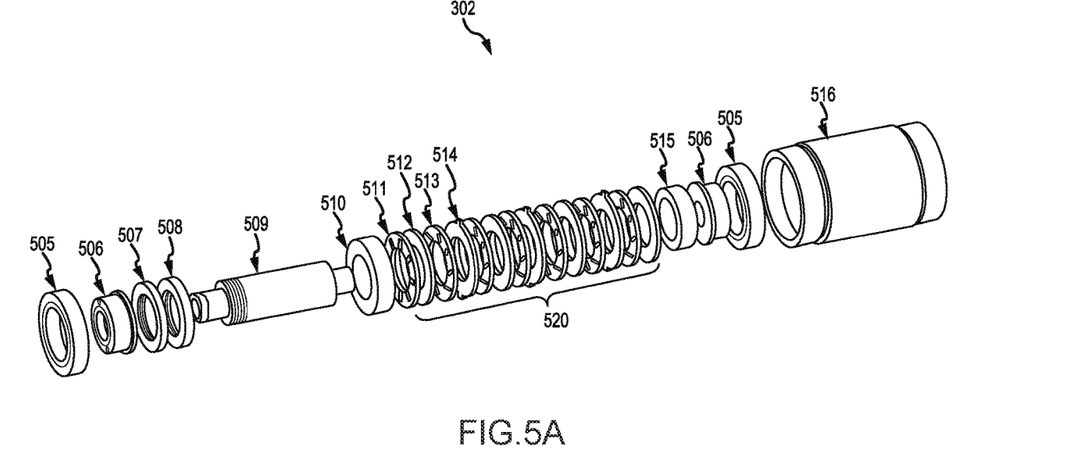
FIG. 5A illustrates an exploded view of an EBR, in accordance with various embodiments.

With reference to FIG. 5A, an exploded view of EBR 302 is illustrated, in accordance with various embodiments. EBR 302 may comprise an inner shaft 509, an electromagnetic actuator 510 disposed around the inner shaft 509, a brake stack 520 disposed around the inner shaft 509, bearings 505 (also referred to herein as first and second bearings) disposed around the inner shaft 509 and disposed at opposite ends of the inner shaft 509, and a cylindrical roller member 516.

In various embodiments, brake stack 520 comprises a plurality of brake disks 512, 514 (also referred to herein as first and second brake disks, respectively), and a plurality of skew rollers 513 disposed between each brake disk 512 and brake disk 514. An end thrust needle cage bearing 511 may be disposed between the electromagnetic actuator 510 and the brake stack 520 to aid is transferring forces smoothly between electromagnetic actuator 510 and brake stack 520. In various embodiments, each skew roller 513 comprises a thrust needle cage bearing having needle bearings oriented at an angle with respect to the radial direction. These "skewed" needle bearings may resist rotation of disks 514 with respect to skew rollers 513 in response to brake stack 520 being compressed.

In the installed position (see FIG. 5B), electromechanical actuator 510 may be coupled to inner shaft 509 in a manner such that electromechanical actuator 510 is stopped from rotating with respect to inner shaft 509. In various embodiments, electromechanical actuator 510 is coupled to inner shaft 509 via a keyway to prevent rotation of electromechanical actuator 510 with respect to inner shaft 509. One or more locking nuts, such as locking nut 507 and locking nut 508 may be threadingly coupled to inner shaft 509. Locking nut 507 and/or locking nut 508 may retain electromechanical actuator 510 to inner shaft 509. Locking nut 507 and/or locking nut 508 may fine tune the braking power generated by EBR 302 by moving electromechanical actuator 510 with respect to brake stack 520. In response to electromagnetic actuator 510 being energized (i.e., with electrical current), the electromagnetic actuator 510 may compress the brake stack 520 (e.g., between spacer 515 and electromagnetic actuator 510) which in turn generates braking effect. In various embodiments, electromechanical actuator 510 is a solenoid. In various embodiments, electromechanical actuator 510 is energized to actuate a plunger or the like to press against brake stack 520. In this regard, electromechanical actuator 510 may be in electronic communication with a power source.

In various embodiments, spacers 506 are disposed at each end of the arrangement whereon bearings 505 are seated. Cylindrical roller member 516 may be slid over the arrangement and supported by bearings 505. In this manner, cylindrical roller member 516 may spin with respect to inner shaft 509 via bearings 505. Cylindrical roller member 516 may be coupled (e.g., via a keyway) to disks 514. In this regard, disks 514 may rotate with cylindrical roller member 516. In this manner, braking force is transferred from brake stack 520 to cylindrical roller member 516. Furthermore, because each disk 514 is sandwiched between skew rollers 513, the cylindrical roller member 516 may rotate freely when electromechanical actuator 510 is in a deenergized state. In this manner, EBR 302 may be selectively actuated to apply braking force to a ULD rolling on cylindrical roller member 516. Stated differently EBR 302 may operate in a deenergized mode (also referred to herein as a first mode) where the cylindrical roller member 516 freely spins to passively provide a rolling surface for translating ULDs thereupon. Furthermore, EBR 302 may operate in an energized mode (also referred to herein as a second mode) wherein the EBR acts as an effective brake for slowing or stopping the translating ULDs thereupon.

Figure 5B:
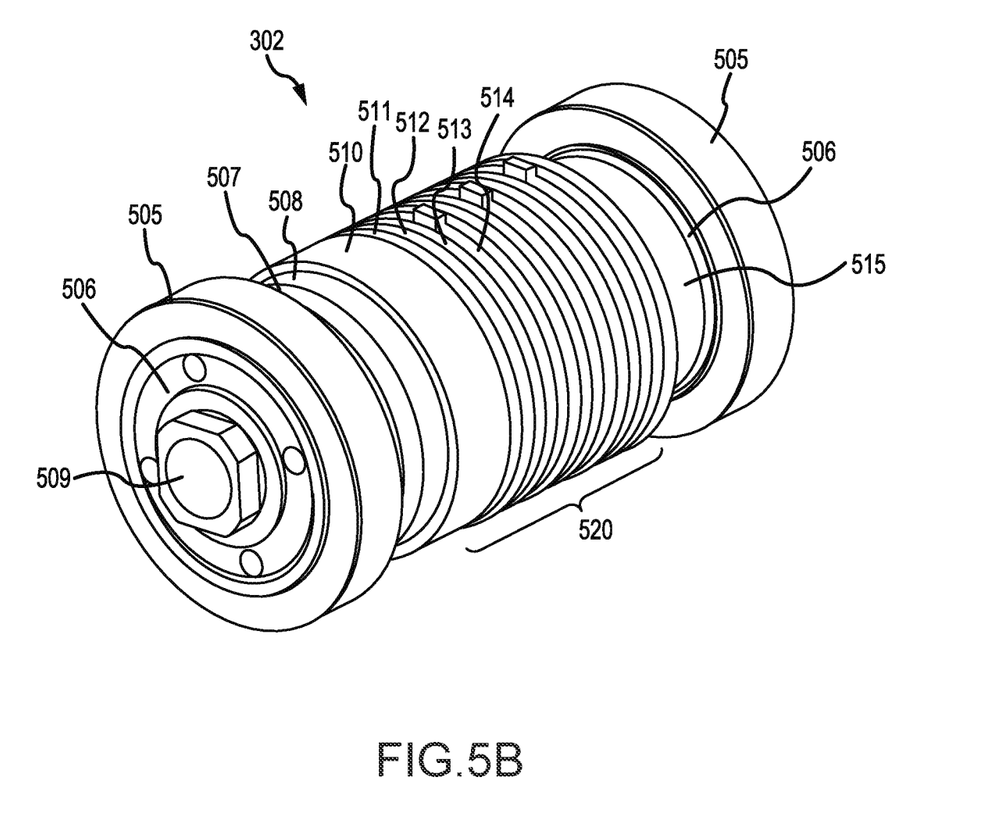
FIG. 5B illustrates a perspective view of the EBR of FIG. 5A with the roller member element omitted for clarity purposes, in accordance with various embodiments.

With reference to FIG. 5B, the EBR 302 is illustrated in an installed position with the cylindrical roller member 516 (see FIG. 5A) omitted for clarity purposes.

Figure 6:
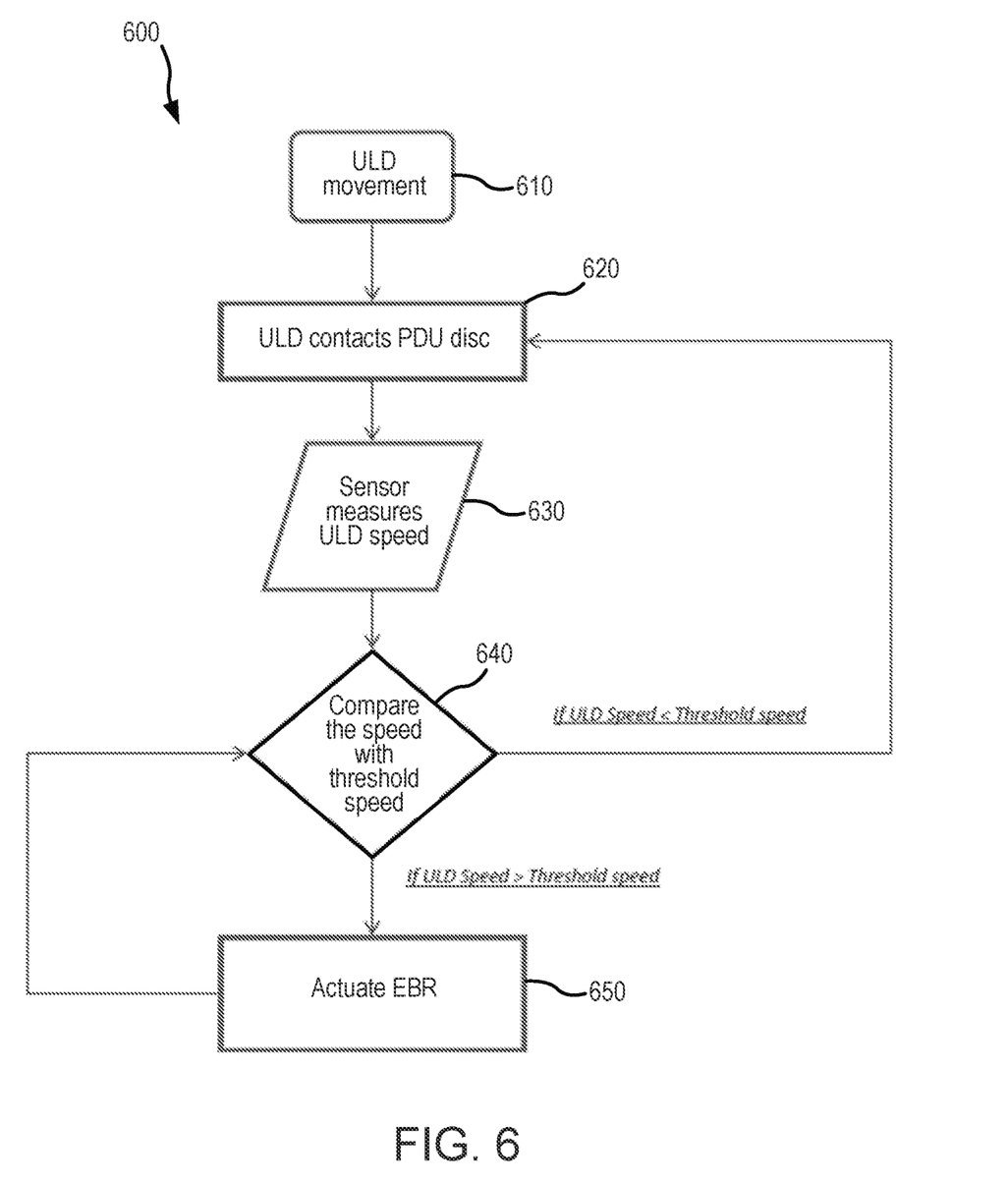
FIG. 6 illustrates a flow chart for a method for automatic electromechanical roller braking, in accordance with various embodiments.

With reference to FIG. 6, a flow chart for a method 600 for automatic electromechanical roller braking is illustrated, in accordance with various embodiments. Method 600 starts in response to a ULD moving with respect to a roller system (step 610). As the ULD moves along the roller system, the ULD may enter into contact with a PDU disk (step 620). A sensor may measure the ULD speed (step 630). The measured ULD speed is then compared with a threshold value (step 640). In response to the ULD speed being greater than the threshold value, an EBR is actuated (step 650). In response to the ULD speed being less than the threshold value, steps 620 through step 640 may be repeated.

With combined reference to FIG. 3 and FIG. 6, step 620 may include ULD (see ULD 120 of FIG. 1) contacting disk 336, causing the disk 336 to rotate at a rotational velocity corresponding to the linear velocity of the ULD. Step 630 may include measuring, by sensor 334 (see FIG. 4A), the ULD speed. Step 630 may be performed by the sensor 334 detecting the rotational velocity of the disk 336. Step 640 may include comparing, by processing unit 350, the ULD speed with a threshold value. In response to the ULD speed being greater than the threshold value, processing unit 350 may send a braking signal to actuate EBR 302 to apply a braking force to EBR 302 and thereby reduce the speed of the ULD.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An automatic electromechanical braking roller system, comprising:
 a power drive unit (PDU) comprising a sensor configured to detect a speed of a unit load device (ULD);

a controller configured to receive a speed signal corresponding to a speed of the ULD from the sensor; and an electromechanical braking roller (EBR) spaced apart from the PDU and configured to receive a braking signal from the controller in response to the speed of the ULD being greater than a threshold value, wherein, in response to the speed of the ULD being less than the threshold value, the EBR is configured to rotate freely about an axis in a first state, and, in response to the speed of the ULD being greater than the threshold value, the EBR is configured to reduce the speed of the ULD in a second state, and the PDU comprises a disk configured to spin freely with respect to the PDU.

2. The automatic electromechanical braking roller system of claim 1, wherein, in response to receiving the braking signal from the PDU, the EBR is energized.

3. The automatic electromechanical braking roller system of claim 1, wherein the disk comprises a magnet.

4. The automatic electromechanical braking roller system of claim 3, wherein the sensor comprises a Hall-effect sensor.

5. The automatic electromechanical braking roller system of claim 1, wherein the sensor detects the ULD speed via the disk.

6. The automatic electromechanical braking roller system of claim 1, wherein the PDU further comprises a motorized roller.

7. The automatic electromechanical braking roller system of claim 6, wherein a diameter of the disk is greater than a diameter of the motorized roller.

8. The automatic electromechanical braking roller system of claim 1, wherein the disk comprises a polymer material.

9. A power drive unit (PDU), comprising:
a motorized roller configured to rotate about an axis;
a disk configured to rotate independent from the motorized roller;
a sensor in operable communication with the disk,
wherein the disk is configured to contact a unit load device (ULD) in response to the ULD translating across the PDU, the disk is configured to rotate in response to the contact, and the sensor is configured to detect a speed of the ULD via the disk.

10. The PDU of claim 9, wherein the disk comprises a magnet, and the sensor is configured to detect the rotational velocity of the disk via the magnet.

11. The PDU of claim 10, wherein the sensor comprises a Hall-effect sensor.

12. The PDU of claim 9, wherein a diameter of the disk is greater than a diameter of the motorized roller.

13. The PDU of claim 9, wherein the disk comprises a polymer material.

14. The PDU of claim 9, wherein the disk and the motorized roller are disposed coaxially.

15. An electromechanical braking roller (EBR), comprising:
an inner shaft;
an electromagnetic actuator disposed around the inner shaft;
a brake stack disposed around the inner shaft;
a first bearing disposed around the inner shaft;
a second bearing disposed around the inner shaft, the first bearing and the second bearing are disposed at opposite ends of the inner shaft; and
a cylindrical roller member disposed around the inner shaft;
wherein the brake stack comprises:
a first brake disk;
a second brake disk; and
a skew roller disposed between the first brake disk and the second brake disk.

16. The EBR of claim 15, further comprising an end thrust needle cage bearing disposed between the electromagnetic actuator and the brake stack, wherein the end thrust needle cage bearing is configured to transfer forces between the electromagnetic actuator and the brake stack.

17. The EBR of claim 15, wherein the cylindrical roller member is configured to freely rotate with respect to the inner shaft in a first state.

18. The EBR of claim 17, wherein the first brake disk is coupled to the cylindrical roller member, whereby a braking force is transferred between the brake stack and the cylindrical roller member in response to the electromechanical actuator applying the braking force to the brake stack in a second state.

* * * * *